US012586108B2

(12) United States Patent
Albayrak et al.

(10) Patent No.: US 12,586,108 B2
(45) Date of Patent: Mar. 24, 2026

(54) SYSTEM AND METHOD FOR DETECTING THE DUPLICATE PRODUCT ON THE E-COMMERCE PLATFORMS

(71) Applicant: D-MARKET ELEKTRONIK HIZMETLER VE TICARET ANONIM SIRKETI, Sisli (TR)

(72) Inventors: Osman Semih Albayrak, Sisli (TR); Tolga Ahmet Kalayci, Sisli (TR); Firat Oncu, Sisli (TR)

( * ) Notice: Subject to any disclaimer, the term of this patent is extended or adjusted under 35 U.S.C. 154(b) by 169 days.

(21) Appl. No.: 18/555,746

(22) PCT Filed: Apr. 12, 2022

(86) PCT No.: PCT/TR2022/050325
§ 371 (c)(1),
(2) Date: Oct. 17, 2023

(87) PCT Pub. No.: WO2022/220780
PCT Pub. Date: Oct. 20, 2022

(65) Prior Publication Data
US 2024/0202789 A1     Jun. 20, 2024

(30) Foreign Application Priority Data

Apr. 17, 2021     (TR) ............................... 2021/006745

(51) Int. Cl.
*G06Q 30/00* (2023.01)
*G06F 16/215* (2019.01)
*G06Q 30/0601* (2023.01)
(52) U.S. Cl.
CPC ....... *G06Q 30/0603* (2013.01); *G06F 16/215* (2019.01)

(58) Field of Classification Search
CPC .......................... G06Q 30/0603; G06F 16/215
See application file for complete search history.

(56) References Cited

U.S. PATENT DOCUMENTS

| | | | |
|---|---|---|---|
| 8,046,372 B1 | 10/2011 | Thirumalai et al. | |
| 8,423,420 B1 | 4/2013 | Bhosle et al. | |
| 8,799,236 B1 | 8/2014 | Azari et al. | |

(Continued)

FOREIGN PATENT DOCUMENTS

CN             112200212 A       1/2021

OTHER PUBLICATIONS

M. K. Nalini, D. K, E. D, R. Gnanavel and D. Vinod, "Implementation of Indexing Techniques to Prevent Data Leakage and Duplication in Internet," 2022 International Conference on Advances in Computing, Communication and Applied Informatics (ACCAI), Chennai, India, 2022, pp. 1-9. (Year: 2022).*

(Continued)

*Primary Examiner* — Anand Loharikar
(74) *Attorney, Agent, or Firm* — Egbert, McDaniel & Swartz, PLLC

(57) ABSTRACT

Disclosed is a duplicate product entry detection system and method for detecting duplicate products in product catalogs of e-commerce platforms running on mobile devices or IT devices. The duplicate product entries can be searched by a duplicate product detection engine running on a deduplication engine server, the similarity calculations can be carried out, and the duplicate product detection can be performed for the finally detected product pairs.

1 Claim, 2 Drawing Sheets

(56) References Cited

U.S. PATENT DOCUMENTS

| | | | |
|---|---|---|---|
| 2009/0089314 A1 | 4/2009 | Hicks | |
| 2009/0132459 A1 | 5/2009 | Hicks | |
| 2014/0108206 A1* | 4/2014 | Chechuy | G06Q 30/0603<br>705/27.1 |
| 2015/0379430 A1 | 12/2015 | Dirac et al. | |
| 2016/0012499 A1* | 1/2016 | Linevsky | G06Q 30/0633<br>705/27.1 |
| 2016/0092479 A1 | 3/2016 | Kabra et al. | |

OTHER PUBLICATIONS

International Search Report for corresponding PCT/TR2022/050325 dated Jul. 7, 2022.

Written Opinion of the International Searching Authority for corresponding PCT/TR2022/050325 dated xxx.

* cited by examiner

SYSTEM AND METHOD FOR DETECTING THE DUPLICATE PRODUCT ON THE E-COMMERCE PLATFORMS

TECHNICAL FIELD

The invention relates to a duplicate product entry detection system and method for detecting the duplicate products in the product catalogs of the e-commerce platforms running on the mobile devices or IT devices.

More specifically, the present invention relates to a system and method which allow the duplicate product entries to be searched by the duplicate product detection engine running on a server, the similarity calculations to be carried out, and the duplicate product detection to be performed for the finally detected product pairs.

STATE OF THE ART

The shopping habits of the consumers have also begun to change with the development of the technology. Recently, the interest in the e-commerce websites and other Internet applications has been increasing. The concept of the e-commerce is a method which allows shopping for any product or service via a website.

It is advantageous for the consumers that the e-commerce websites save time and space during shopping compared to the physical stores and can keep all the products together. In the face of the increasing demand for the e-commerce websites, the companies make effort to have a product catalog that can meet the sectoral standards.

Since it is possible to define a product entered into the catalog by the product suppliers with the different words, different images and components, the duplicate product entries occur. The detection of said duplicate products continues to be a problem for the companies. Generally, the present duplicate product detection methods have not been developed specifically for the e-commerce websites. Thus, these methods are insufficient for detecting the duplicate products on the e-commerce websites.

The traditional similarity methods used in the detection of the duplicate products cannot detect the duplicate product entries. For example, there are the fashion brands giving exactly the same name to hundreds of different products in a data set. Although the names of these products are exactly the same, they are not the same products. Since it is impossible to set the different thresholds for thousands of different brands, the traditional string similarity methods are disadvantageous in detecting whether two given products are duplicates or not. This requires developing a duplicate product entry detection engine for detecting the duplicate products in the product catalogs of the e-commerce platforms running on the mobile device or IT devices.

In the U.S. Pat. No. 8,046,372B1, a method developed for detecting the duplicate product entries in an electronic product catalog is disclosed. Here, the traditional string similarity algorithms are used to detect the duplicate products. However, it is insufficient since the brand-specific and category-specific features are not used and a solution to reduce the number of pairwise comparisons is not provided.

The patent document no. US20150379430 relates to a method for comparing two datasets and detecting whether one or more parts of one or more entries of a dataset are contained in the other. Therefore, said method does not allow to detect the duplicate products in the product catalogs of the e-commerce platforms using the binary copies and images.

In the U.S. Pat. No. 8,423,420, a universal shopping cart is disclosed, which can be used to view the products from the various websites and to purchase them together. Said method warns the user about the duplicate products in the shopping cart. However, a duplicate product entry detection engine for detecting the duplicate products in the product catalogs of the e-commerce platforms running on the data processing devices is not disclosed.

Consequently, the need for querying the duplicate product entries by the duplicate product detection engine running on a server, carrying out the similarity calculations, and performing the duplicate product detection for the finally detected product pairs makes necessary the emergence of the solution according to the present invention.

OBJECT AND SUMMARY OF THE INVENTION

The object of the invention is to provide a duplicate product entry detection system and method for detecting the duplicate products in the product catalogs of the e-commerce platforms running on the mobile devices or data processing devices.

Another object of the invention is to provide a system and method which allow the duplicate product entries to be searched by the duplicate product detection engine running on a server, the similarity calculations to be carried out, and the duplicate product detection to be performed for the finally detected product pairs.

Another object of the invention is to provide a duplicate product detection method in which the various text similarity algorithms, e-commerce specific text similarity metrics and visual similarity metrics are used to create a data set trainable from raw data.

Another object of the invention is to provide a duplicate product detection method in which the binary classification models are trained using the data set created to detect whether any two products are duplicates.

To achieve the above-mentioned objects, the invention provides a system comprising a product catalog database server comprising the data on the products in the e-commerce website, a deduplication engine server for detecting the duplicate products, a product similarity metrics database server comprising the similarity data calculated for the duplicate product pairs by a deduplication engine server, an FTP server in which the data on the duplicate product pairs detected by the deduplication engine server is stored as a CSV file, an application server for labeling the duplicate products, a similar product database server comprising the data on the duplicate product pairs, a service server for performing the operations such as searching, logging, updating, entering the operation results etc. for the duplicate product entries.

The invention relates to a duplicate product entry detection system and method for detecting the duplicate products in the product catalogs of the e-commerce platforms running on the mobile devices or IT devices, wherein the method comprises the following steps:

sending the product information from the product catalog database server to the deduplication engine server for the purposes of querying the duplicate products by the duplicate product detection engine, performing the similarity calculations, and detecting the final duplicate product, sending the data on the product pairs predicted to be duplicates by the deduplication engine server to the FTP server as a CSV file to perform an operation on the deduplication screens on the application server, sending the similarity data calculated for the product pairs by a deduplication engine server to the similarity metrics database server to be used in the classification models, sending the similarity metrics previously calculated for the product pairs from the similarity metrics database server to the deduplication engine server to be used to develop the classification model, sending the data in the duplicate product file found in the FTP server and detected to be duplicate from the FTP server to the application server, sending the data on the duplicate product files from the application server to the similar product database server, listing the candidate duplicate product entries on the duplicate product tagging screens on the application server, searching on the lists, and labeling the duplicate products, and sending the labeled data to the service server, entering the results of the tagging operation for the duplicate product entries to the similar product database server by the service server, retrieving the results of the labeling operation on the deduplication screens from the similar product database by the deduplication engine to be used by the duplicate product detection model, updating the product catalog database server by means of the service server to close the products detected to be duplicates.

REFERENCE NUMBERS

Figure 1:
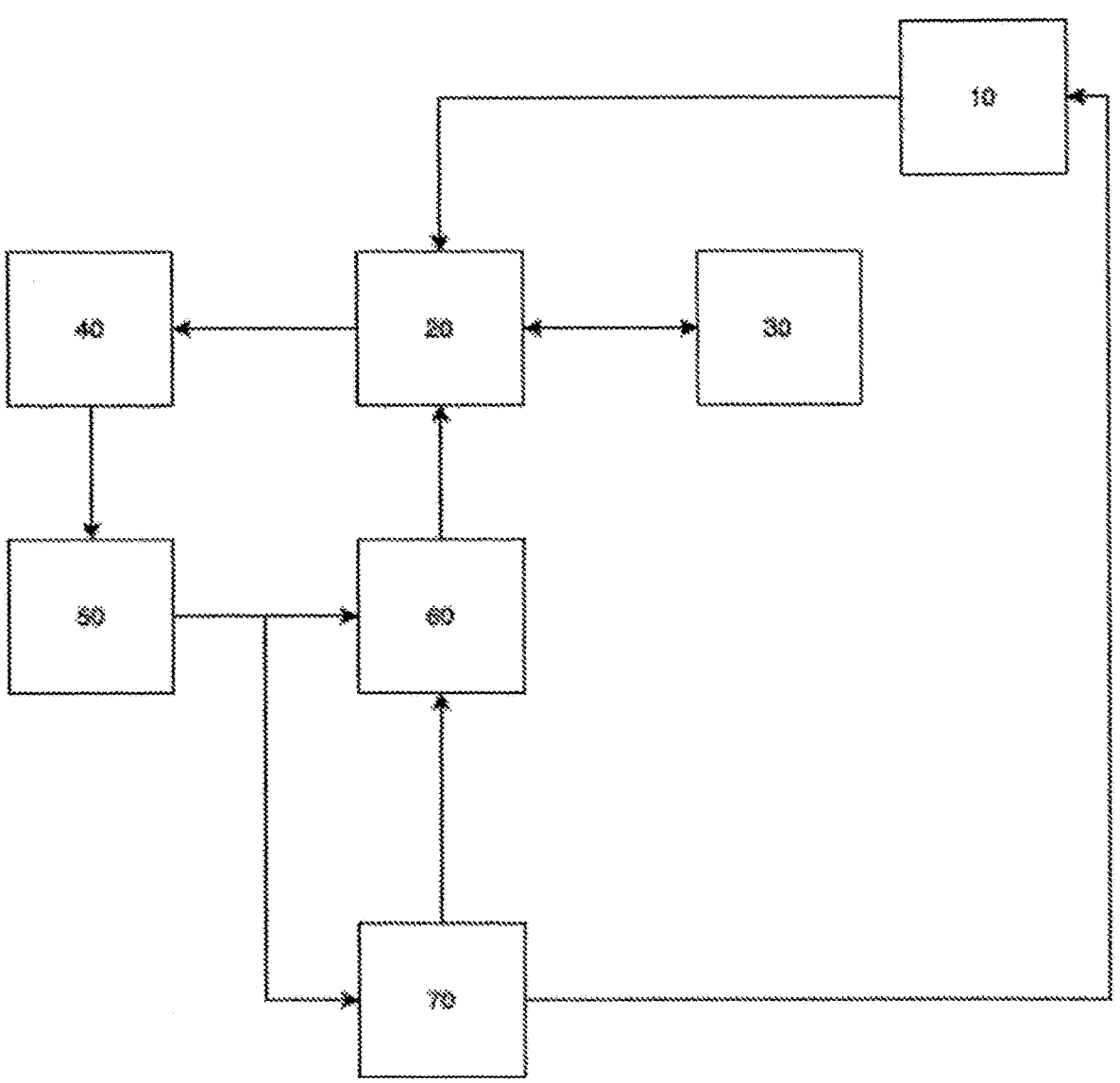
FIG. 1 shows the system components of the method according to the invention and the relationship therebetween.

10. Product catalog database server
20. Deduplication engine server
30. Product similarity metrics database server
40. FTP Server
50. Application server
60. Similar product database server
70. Service server

DETAILED DESCRIPTION OF THE INVENTION

The invention relates to a duplicate product entry detection system and method for detecting the duplicate products in the product catalogs of the e-commerce platforms running on the mobile devices or IT devices. The duplicate product entries can be queried by the duplicate product detection engine running on a deduplication engine server (20), the similarity calculations can be carried out, and the duplicate product detection can be performed for the finally detected product pairs.

The system components of the method according to the invention and the relationship therebetween can be seen in FIG. 1. Said system comprises a product catalog database server (10) comprising the data on the products in the e-commerce website, a deduplication engine server (20) for detecting the duplicate products, a product similarity metrics database server (30) comprising the similarity metrics calculated for the duplicate product pairs by a deduplication engine server (20), an FTP server (40) in which the data on the duplicate product pairs detected by the deduplication engine server (20) is stored as a CSV file, an application server (50) for labeling the duplicate products, a similar product database server (60) comprising the data on the duplicate product pairs, a service server (70) for performing the operations such as searching, logging, updating, entering the operation results etc. for the duplicate product entries.

In the present of the invention, the product information required for the duplicate products to be searched by the duplicate product detection engine, for the similarity calculations to be carried out, for the final duplicate product detection to be performed, and to perform the detection in the form of "duplicate"/"not duplicate" or "variant of each other" for the finally detected product pairs is found in the product catalogue database server (10). Said product information is sent from the product catalog database server 10 to the deduplication engine server (20). The data on the product pairs predicted to be duplicates as a result of the calculations in the deduplication engine server (20) is sent to the FTP server (40) as a CSV file to perform an operation on the duplicate product platform screens (deduplication screens) on the application server (50). The similarity metrics calculated for the product pairs by a deduplication engine server (20) is stored in the similarity metrics database server (30) to be used later in the classification models. The similarity metrics previously calculated for the product pairs are sent from the similarity metrics database server (30) to the deduplication engine server (20) to be used to develop the classification model. The data in the duplicate product file found in the FTP server (40) and detected to be duplicate is retrieved from the FTP server (40) to the application server (50). The data on the duplicate product files retrieved to the application server (50) are entered into the similar product database server (60). The possible duplicate product entries can be listed on the duplicate product labeling screens on the application server (50), and a search can be performed on the lists. The products are labeled in the form of "duplicate"/"non-duplicate" or "variant of each other" by the product specialists and the product data is sent to the service server (70). The service server (70) enters the results of the labeling operation for the duplicate product entries on the deduplication screens to the similar product database server (60). The results of the labeling operation on the deduplication screens are retrieved from the similar product database server (60) by the deduplication engine server (20) to be used by the duplicate product detection model. The product catalog database server (10) is updated by means of the service server (70) to close the products detected to be duplicates.

Figure 2:
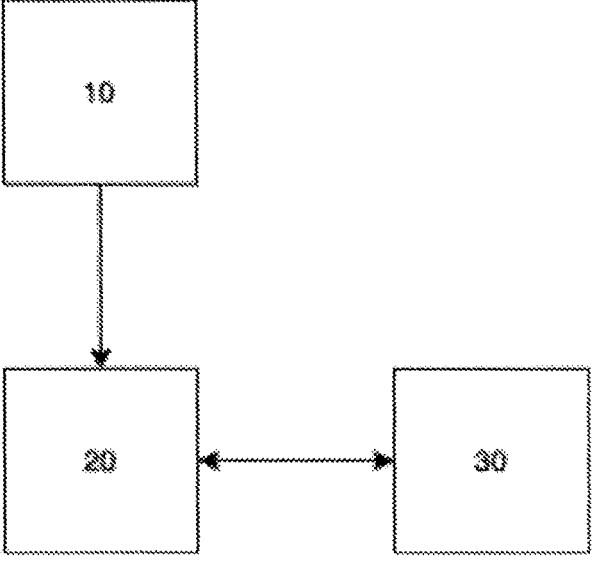
FIG. 2 shows the system components of the duplicate product detection engine and the relationship therebetween.

FIG. 2 shows the system components of the duplicate product detection engine and the relationship therebetween. The deduplication engine server (20) interacts with the product catalog database server (10) and the product similarity metrics database server (30). The duplicate product detection engine running on the deduplication engine server (20) detects the duplicate product pairs in three steps. In the first step, the similar product pairs are detected using the traditional text similarity algorithms. The product pairs above a certain threshold are accepted as the candidate duplicate product pairs. The product list created according to this rule is displayed on a duplicate product platform screen and labeled in the form of "duplicate," "not duplicate" or "variant of each other" by the product specialists. In the second step, the binary classification models are trained using the labeled product pairs data. The text similarity scores generated as the features of the model in the first step are used. In the third step, the text-based model is enriched by using the additional variables expressing the similarities of the product images, price information and brand characteristics.

In the method according to the invention, unlike all other methods, the binary classification models are trained by creating the data sets to detect whether any two products are duplicates or not. The traditional string similarity algorithms are combined with the adaptive learning methods. In the deduplication engine server (20), the traditional string similarity algorithms are used to calculate the similarity scores related to the product entries. The data on the product pairs above a certain threshold value are sent to the FTP server (40) to allow them to be labeled as the candidate duplicate products in the form of "duplicate/variant/not duplicate" on the deduplication screens by the product specialists. The classification models are trained by using the product pairs labeled by the product specialists as a data set.

The classification models are trained using said labeled data set. The model features are the similarity scores of the traditional string similarity algorithms and the brand-specific features. The model has been developed by adding the new features such as image similarity scores, price differences and brand characteristics. Instead of comparing all the possible product pairs, only the products pairs of the same brand and same category are compared. In addition, the popular product (hero product) algorithm has been developed to prevent the closing of the best-selling products.

The invention claimed is:

1. A duplicate product entry detection method for detecting duplicate products in a product catalog of an e-commerce platform running on a mobile or IT device having a product catalog database server having data on the product in the e-commerce platform, a deduplication engine server that detects the duplicate products, a product similarity metrics database server having similarity data calculated for duplicate product pairs by the deduplication engine server, an FTP server in which the similarity data on the duplicate product pairs detected by the deduplication engine server is stored in a CSV filed, an application server that labels duplicate products, a similar product database server having data on the duplicate product pairs, and a service server that searches, logs, updates and enters operation results for the labeled duplicate product entries, the duplicate product entry detection method comprising:

sending the product information from the product catalog database server to the deduplication engine server so as to detect similar product pairs by a duplicate product detection engine running on the deduplication engine server by using a test similarity and accepting the product pairs above a threshold value designated as candidate duplicate product pairs;

sending the data on the candidate duplicate product pairs to the FTP server as the CSV file so as to perform the product labeling operations by a product specialist in a duplicate or not duplicate form or a variation of each other on a deduplication screen of the application server;

sending the data on the candidate duplicate product pairs to a similarity metric database server so as to form a classification model or similarity metrics;

sending the similarity metric to the deduplication engine server so as to develop the classification model;

sending data for a duplicate product file in the FTP server and detected as duplicate from the FTP server to the application server;

sending the data on the duplicate product file from the application server to the similar product database server;

listing potential duplicate product entries on the deduplication screen on the application server;

searching the listed potential duplicate product entries;

labeling searched listed potential duplicate product entries as to whether the labeled searched listed potential duplicate product entries are a duplicate product or not a duplicate product via a duplicate product platform screen;

sending the labeled searched listed potential duplicate product entries to the service server;

entering results of the step of labeling to the similar product database server by the service server;

retrieving the entered results of the step of labeling on the deduplication screen from the similar product database server by the deduplication engine server so as to be used by the duplicate product detection model;

training binary classification models with the label product pairs data;

using text similarity scores for the binary classification models;

enriching a text-based model with additional variables that express similarities of product images and price information and trademark characteristics; and updating the product catalog database server by the service server to close the detected products as duplicates.

* * * * *